United States Patent [19]
Endo et al.

[11] 3,913,117
[45] Oct. 14, 1975

[54] FOCAL PLANE SHUTTER FOR PHOTOGRAPHIC CAMERA

[75] Inventors: Takashi Endo; Masaaki Morota, both of Tokyo, Japan

[73] Assignee: Yashica Co., Ltd., Tokyo, Japan

[22] Filed: July 22, 1974

[21] Appl. No.: 490,745

[30] Foreign Application Priority Data
Nov. 13, 1973 Japan.............................. 48-126807
Nov. 15, 1973 Japan.............................. 48-131224
Mar. 5, 1974 Japan.............................. 49-25283

[52] U.S. Cl................................ 354/242; 354/205
[51] Int. Cl.[2]....................... G03B 9/34; G03B 9/66
[58] Field of Search.......................... 354/204–205, 354/241–244, 234, 238, 258, 252

[56] References Cited
UNITED STATES PATENTS
2,514,991  7/1950  Doyle et al. .......................... 354/205
2,758,527  8/1956  McFadden............................. 354/242
3,688,675  9/1972  Yamashita et al. ................... 354/242

*Primary Examiner*—Samuel S. Matthews
*Assistant Examiner*—James LaBarre
*Attorney, Agent, or Firm*—Oblon, Fisher, Spivak, McClelland & Maier

[57] ABSTRACT

A focal plane shutter system for photographic camera comprises a first shutter curtain mechanism for driving a shutter curtain which is moved from a closed position to an opened position to cause the film to be exposed to light when the shutter is operated; a second shutter curtain mechanism having a curtain winding shaft provided independently of the first shutter curtain mechanism and driving a shutter curtain which is moved from an opened position to a closed position to stop the said film exposure when the shutter is operated; a winding mechanism having a winding force transmission member provided with a portion to be engaged with the first and second shutter curtain mechanisms during the course of the winding operation thereof and with another portion to be disengaged with the first and second shutter curtain mechanisms at the end of the winding operation; a holding means for holding the first and the second shutter curtain mechanisms at end positions of the winding operation; a release means for controlling the holding means to operate the first and second shutter curtain mechanisms for the film exposure; and a stopper means for stopping the first and second shutter curtain mechanisms at the end positions of operation.

5 Claims, 8 Drawing Figures

FOCAL PLANE SHUTTER FOR PHOTOGRAPHIC CAMERA

The present invention relates to a focal plane shutter for photographic camera, more paritcularly to a focal plane shutter having winding shafts separately provided for the first curtain winding and for the second curtain winding.

It has been the most important problem to reduce the inertia of a shutter mechanism in order to improve the performance characteristics of the focal plane shutter. This is because if the inertia of the shutter mechanism is lessened, the acceleration of the shutter becomes easier, thus improving the performance characteristics of the shutter, and reducing the unnecessary shock occurring at the completion of the shutter operation.

For reducing the inertia of the shutter mechanism, it is necessary to lighten the whole shutter mechanism by eliminating if possible the curtain associated mechanism when the curtains are operated.

Mechanical elements which are involved for the operation of the shutter are shutter curtains, winding shafts to wind the shutter curtains and driving shafts to drive the curtains.

In the conventional twin-shaft type focal plane shutter having curtain winding shafts provided independently of the first and second curtain mechanism, some elements are moved together with the basically required elements when the shutter is operated. For example, gears are engaged with the winding shafts and rotate within one turn during the shutter operation to disengage the winding shafts from the winding power transmission mechanism and to govern the shutter speed.

Further, since the focal plane shutter is moved at a considerably high speed during its operation, the shutter bounds back in the opposite direction when it is stopped suddenly at the end of the operation at a predetermined position. This causes any erroneous exposure to the film and also causes when the bound is large an unpleasant shock to users.

Further, since the shutter curtain mechanism runs at a considerably high speed, the bounce and shock remain unsolved, even if the shutter curtain mechanism can be lightened. Meanwhile, the shock and the bounce can be eliminated by gradually decelerating the speed of the curtain immediately before the end of the operation, which however causes disadvantage that the shutter mechanism cannot be stopped at a precise predetermined position.

The primary object of the present invention is to provide a twin-shaft type focal plane shutter, wherein the inertia of those parts movable during the shutter operation is lessened.

Another object of the present invention is to provide a focal plane shutter wherein the winding power transmission mechanism is disengaged from the shutter curtain mechanism at the present invention is to provide a focal plane shutter wherein the shutter curtain mechanism can be stopped accurately at a predetermined position of the shutter operation.

Still further object of the present invention is to provide a focal plane shutter wherein the shutter bounding is prevented and the shutter can be stopped accurately at a predetermined position at the end of the operation of the focal plane shutter.

The foregoing and other objects of the present invention will be fully understood from the following detailed description of the invention with reference to the attached drawings.

Figure 1:
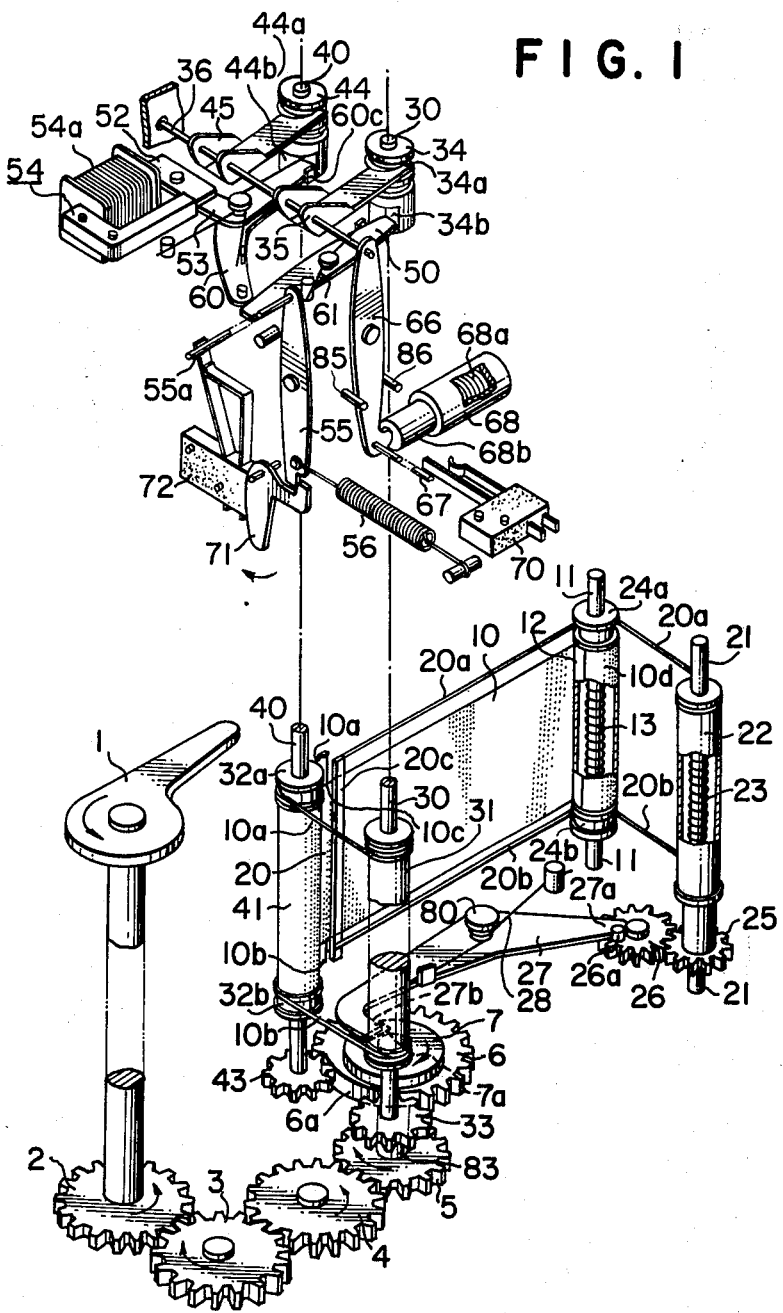
FIG. 1 is an oblique schematic view of the preferred embodiment of the focal plane shutter according to the present invention, shown at the state of the end of the shutter winding operation.

In the drawings, the numeral 11 indicates a shaft for the first curtain winding drum 12, the shaft being fixedly provided within the camera body. To the shaft 11, the first curtain winding drum 12 having a hollow shape is rotatably supported. The first curtain winding drum 12 is always urged by a spring 13 inserted therein for driving the first curtain 10 and imparting a rotative force thereto in the direction in which the first curtain 10 is wound, namely in the clockwise direction. On the top and at the bottom of the drum 12, rollers 24a and 24b for guiding strings 20a and 20b of the second curtain 20 are respectively provided rotatably on the shaft 11.

The numeral 21 indicates a shaft for a second curtain winding drum 22, the shaft being fixedly provided within the camera body. On the shaft 21, the second curtain winding drum 22 having a hollow shape is rotatably supported. The drum 22 is always urged by a spring 23 inserted therein for driving the second curtain 20 and imparting a rotative force thereto in the direction in which the first curtain 10 is wound, namely in the clockwise direction. At the lower end of the drum 22, a gear 25 is integrally provided to the drum 22 for transmitting the information on the position of the second curtain 20 to the winding mechanism. The gear 25 is engaged with a transmission gear 26 which is pivotally mounted within the camera body. The transmission gear 26 is arranged so as to rotate almost one turn during the course of the operation of the second curtain 20.

The numeral 30 is a first curtain winding shaft which is rotatably supported within the camera body. To the shaft 30 a first curtain winding drum 31 is fixed. To the lower and upper ends of the first curtain winding shaft 30, a first curtain winding gear 33 and a first curtain control member 34 are integrally fixed, respectively. Along the upper external periphery of the first curtain control member 34, a spiral groove 34a is provided, while along the lower external periphery thereof, a cam 34b is provided, whose detailed explanation will be given with reference to FIG. 6.

The numeral 40 is a second curtain winding shaft rotatably supported within the camera body. To the shaft 40, a second curtain winding drum 41 is integrally provided.

At the top and bottom of the second cutain winding drum 41, first curtain guide rollers 32a and 32b are rotatably supported, respectively.

To the lower and upper ends of the second curtain winding shaft 40, a second curtain winding gear 43 and a second curtain control member 44 are integrally fixed, respectively. On the top of the second curtain control member 44, a spiral groove 44a is provided to control the terminal position of the operation of the second curtain 20, while at the bottom of the second curtain control member 44, a cam 44b is provided to control the start position of the second curtain operation, whose detail will also be explained with reference to FIG. 6.

The first curtain 10 is sticked at one end 10d to the first curtain winding drum 12. Its other end is sticked to a metal frame 10c, strings 10a and 10b being installed at the upper and lower ends of the metal frame, respectively. The strings are mounted in a wound-up form on the first curtain winding drum 31 through the guide rollers 32a and 32b, respectively.

The second curtain 20 is sticked at the one end to the second curtain winding drum 41. FIG. 1 shows the curtain most part of which is wound up around the said drum 41. The other end of the curtain 20 is sticked to a metal frame 20c and the strings 20a and 20b are installed on the upper and lower ends of the metal frame 20c. The second curtain 20 is arranged to be wound around the second curtain winding drum 22 by the strings 20a and 20b through a pair of rollers 24a and 24b.

The numeral 1 indicates a winding lever provided outside the camera body. The rotative force applied to the winding lever 1 is transmitted to a deficient-teeth gear 6 in the final coupling stage through a series of transmission gears 2, 3, 4 and 5. On the deficient-teeth gear 6, there is provided a notch plate 7 to hold engageably the deficient-teeth gear 6 at the end position of the winding operation.

Figure 3:
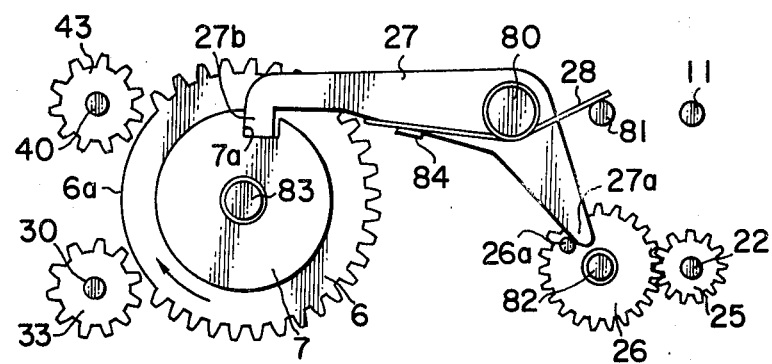
FIGS. 3 and 4 are plan views to illustrate the operation of the winding power transmission member of the shutter device, FIG. 3 showing the member at the state of the end of the winding operation and FIG. 4 showing the member at the state of the end of the shutter operation.
Figure 4:
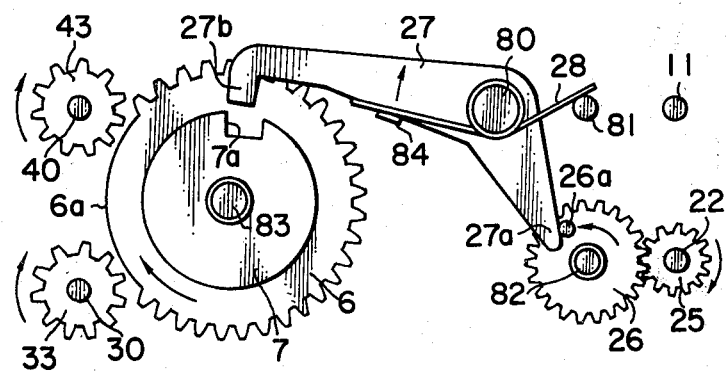
Figure 5:
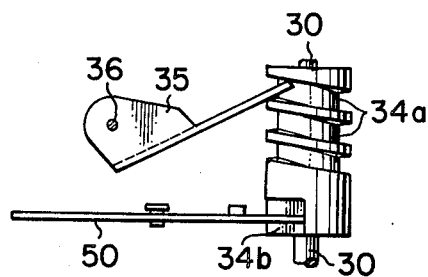
FIG. 5 shows a mechanism for holding the first curtain mechanism at its end position of the winding operation.

The deficient-teeth gear 6 has a toothed portion which engages with the first curtain winding gear 33 and the second curtain winding gear 43, and also a toothless portion 6a which does not engage with the gears 33 and 43. FIGS. 3 and 4 are shown enlarged to explain the relationship between the two winding gears 33, 43 and the deficient-teeth gear 6. The toothed portion comprises a sufficient number of teeth that permits the engagement sequentially with the winding gears 33 and 43, When the gear 6 rotates a full turn thus bringing the first and second curtains 10 and 20 to the wound up position ready for their operations. When the shutter winding is to be completed by its halfrotation of the gear 6, the winding gears 33 and 43 may be arranged so that they correspond with two toothless portions with a smaller width provided at two positions along the semi-circular periphery of the said gear 6.

The lever 27 is a transmission lever which is rotatably pivoted by means of a shaft 80 within the camera body. To the transmission lever 27 a rotative force is imparted to the clockwise direction by a spring 28 which has one end engaged with a bent piece 84 and the other end engaged with a fixed pin 81. The transmission lever 27 is arranged so that, when a pawl 27b at one end thereof is not engaged with the notch 7a of the notch plate 7 and the other end thereof is not engaged with a pin 26a mounted on a gear 26, the pawl 27b at the one end touches lightly the external peripheral surface of the notch plate 7.

The numeral 54 indicates an electromagnet arranged so that the electric current is supplied to a coil 54a from a suitable electric circuit (not shown) to produce a magnetic attractive force for a time interval corresponding to the shutter speed. As is better shown in FIG. 6, levers 53 and 60 are mounted coaxially and pivotally on the same shaft. To the lever 60 is imparted by a spring 51 a rotative force in the counterclockwise direction. The lever 53 is urged counterclockwise by a part 60c of the lever 60 bent up upwardly. At one end of the lever 53, there is pivoted a magnetic iron piece 52 which is attracted by the electromagnet 54.

The respective front ends of these levers 53 and 60 are arranged to engage with a cam 44b so that the control member 44 is prevented from rotating in the clockwise direction, when the second curtain is wound up completely.

The numeral 50 indicates a first curtain holding lever pivoted within the camera body and imparted a rotative force in the counterclockwise direction always by a spring 61. The front end of the lever 50 is engaged with the cam 34b of the first curtain control member to prevent the clockwise rotation of the first curtain winding shaft 30.

The numerals 35 and 45 indicate regulating levers to limit the terminal positions of the operations of the first and the second curtain mechanisms. The numeral 36 indicates a shaft common to both of these levers 35 and 45. The shaft 36 has its one end 36a supported by a bearing provided at a fixed position within the camera body and has its other end supported by a bearing provided on a lever 66 pivoted at another fixed position within the camera body.

Figure 2:
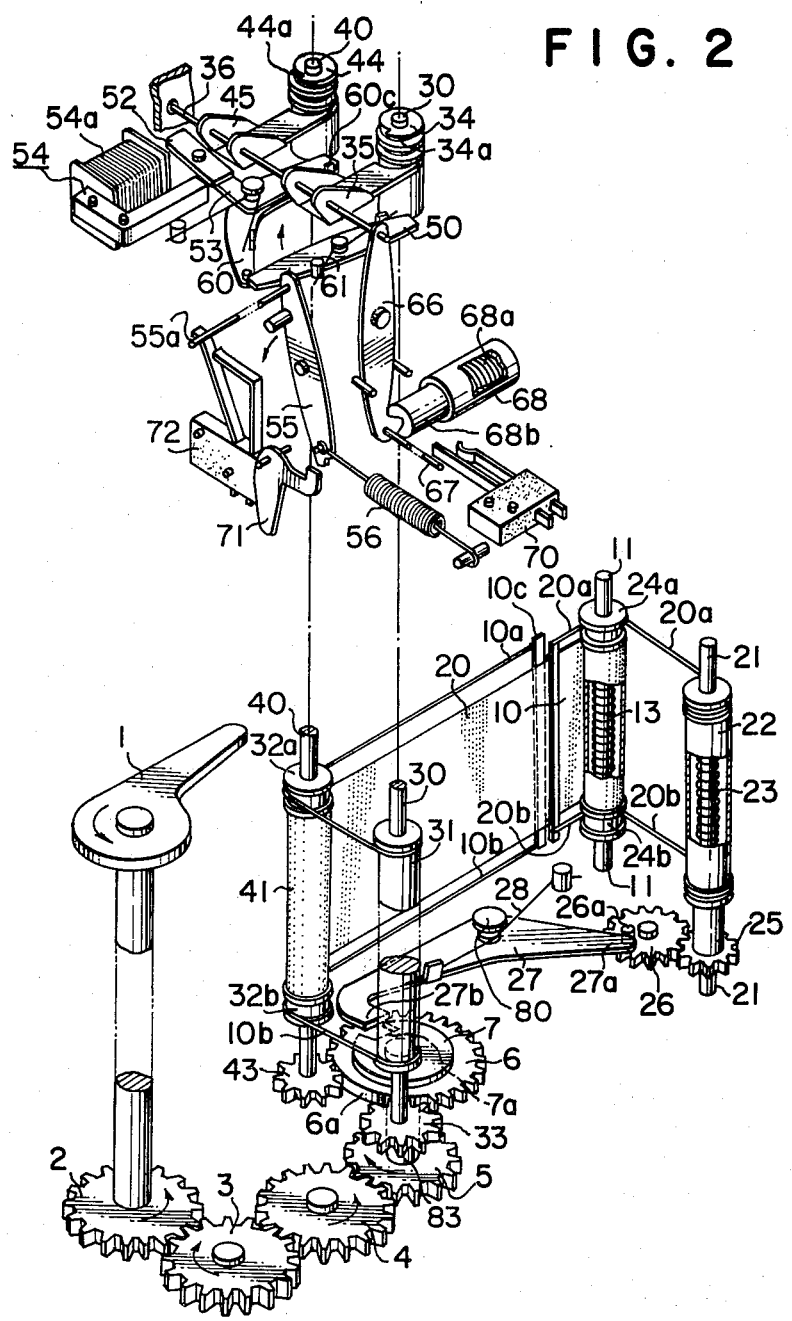
FIG. 2 is an oblique schematic view of the shutter device shown in FIG. 1, showing it at the state of the end of the shutter operation.

Further explanation will be given on the relationship between the first curtain control member and the regulating lever 35 and between the second curtain control member and the regulating lever 45. Each of the regulating levers 35 and 45 is supported in such a position that each of the pawls 35a and 45a provided at the tips of the respective regulating levers is inserted lightly into each of the spiral grooves 34a and 44a provided at the upper external periphery of the respective control members 34 and 44 so as to move up and down in accordance with the rotation of the respective control members. As the control members are rotated in accordance with the operation of the associated curtains, the pawls of the respective regulating levers are lowered gradually until the curtains reach to their terminal positions of operation. When the operation of the curtains is over, the pawls reach to the terminal ends 34c and 44c of the respective spiral grooves to cause the further rotations of the control members to be stopped. FIG. 2 shows a state in which the operations of the first and the second curtains are both completed, with the tip of the first curtain regulating lever 35 abutting against the terminal end 34c of the spiral groove 34a of the first curtain control member 34 and the tip of the second curtain regulating lever 45 abutting against the terminal end 44c of the spiral groove 44a of the second curtain control member 45, respectively preventing the rotations of the control members.

Figure 7:
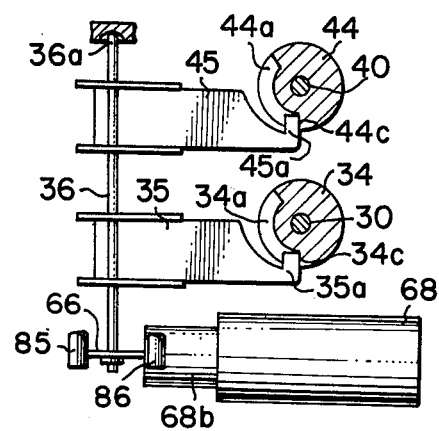
FIGS. 7 and 8 show means for stopping the first and the second shutter curtain mechanism at predetermined end positions of operation thereof, FIG. 7 showing its plan view and FIG. 8 its side elevation.

When the regulating levers abut against the terminal ends of the spiral grooves, the shaft 36 is urged to the left as viewed in FIG. 7 due to the rotative force of the control members 34 and 44. As a result, the lever 66 receiving one end of the shaft 36 swings slightly in response to this force, which will be further explained in detail with reference to FIGS. 7 and 8.

Figure 8:
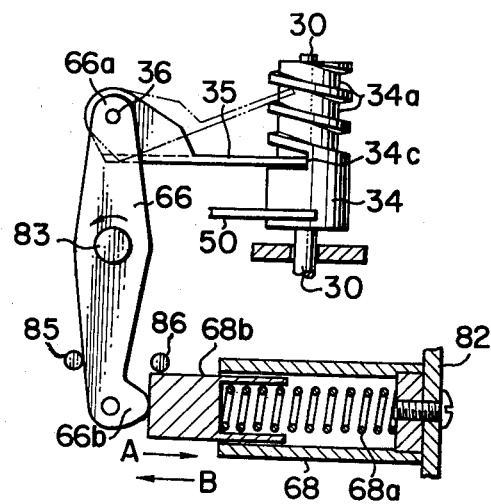

In FIG. 7, the force applied to the shaft 36 from the right thereof, as viewed in FIG. 7, moves the shaft 36 in the clockwise direction around the one end 36a thereof and acts so as to cause the damper lever 66 to rotate in the couterclockwise direction (FIG. 8). One of the damper lever 66 is a bearing 66a and a pawl 66b provided at the opposite end of the lever 66 is contacted with a piston 68b of an air damper to be described hereafter.

The numeral 68 indicates a cylinder of the air damper of piston type. The piston 68b is slidably fitted into the cylinder 68. A compression spring 68a is inserted between the cylinder 68 and the piston 68b.

In the present embodiment, the damper is designed as an air viscosity damper having a gap between the inner surface of the cylinder of 4mm in diameter and the outer surface of the piston 68b being of about 0.03mm smaller than the said inner surface of the said cylinder. However, it can be contructed as an air slot piston type (or dashpot type). The spring 68a is used to return the piston 68b to its original position after the impact on the piston 68b has been removed. The spring 68a itself can be readily compressed by the impact applied to the piston 68b, although it has a sufficient strength to overcome the force as applied to the piston 68b caused for example by the springs 13 and 23 (see FIG. 2), when the winding shafts 30 and 40 are forced to rotate in the clockwise direction at the end of the shutter operation.

The pins 85 and 86 provided fixedly within the camera body are used to define the moving range of the damper lever 66 and the damper lever 66 swings within this range.

The numeral 55 indicates a release lever to push rotatively the holding lever 50 and to release the control member (FIGS. 1 and 2). Although a rotative force is being applied to the holding lever 50 by a spring 56 to rotatively push the release lever 55, the holding lever 50 is maintained in the position shown in FIG. 1 being engaged with a lever 71 until the shutter button (not shown) is depressed. And when the shutter button (not shown) is depressed, the lever is pushed toward the direction of arrow (FIG. 1) to release the engagement of the holding lever 55 with the lever 71.

The device according to the embodiment operates as follows:

In the first place, it will be described from the state in which the winding is completed (FIG. 1) and the start of the shutter operation.

As a result of the rotation of the deficient-teeth gear 6 of the shutter acceleration device in the direction as indicated by arrows in FIGS. 1 and 3, the winding gears 33 and 43 are both attached to the toothless portion 6a of the said deficient-teeth gear, thus releasing the engagement between these gears, and the deficient-teeth gear itself is maintain at its shutter accelerating position through the engagement of the pawl 27b of the transmission lever 27 with the notch portion 7a provided on the gear 6.

In this state, if the lever 71 is pushed toward the direction as indicated by the arrow in FIG. 1 as a result of depression of the shutter button (not shown), the release lever 55 is disengaged from the lever 71.

Figure 6:
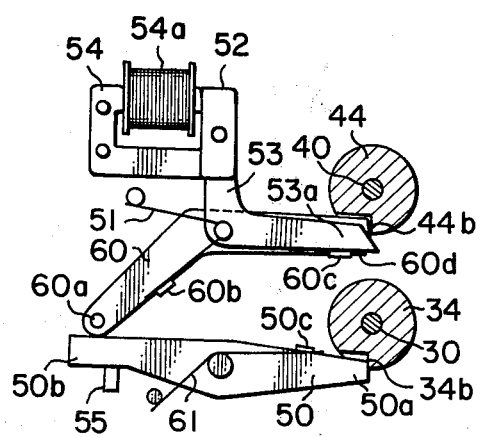
FIG. 6 is a plan view of the holding mechanism which is partially broken away.

The release lever 55 pushes rotatively the first curtain holding lever 50 in the clockwise direction (FIG. 6). As a result, the tip 50a of the first curtain holding lever 50 is disengaged from the cam 34b of the first curtain control member to permit the first curtain winding shaft 30 to be rotated in the clockwise direction, and the first curtain 10 is wound up by the first curtain winding drum 12 to move toward the shutter opening direction.

The second curtain holding lever 60 is pushed by the free end of the first curtain holding lever 50 to be moved rotatively in the clockwise direction. Consequently the end 60d of the second curtain holding lever 60 is disengaged from the cam 44b of the second curtain control member. The clockwise rotation of the second curtain holding lever 60 causes the electromagnetic holding lever 53 to be released from the upwardly-bent section 60c of the second curtain holding lever 60 and to be permitted free to rotate. However, when the shutter is released, since electric current is suppled to the electromagnet 54 from an electric circuit (not shown) and the iron piece 52 pivoted on the electromagnetic holding lever 53 is attracted by the electromagnet 54 to stick thereto, the electromagnetic lever is maintained at the position as shown in FIGS. 1 and 6 without force by the lever 60. Therefore, after the second curtain holding lever 60 has moved as described above, the clockwise rotation of the second curtain control member 44 is being prevented by the engagement of the tip 53a of the electromagnetic holding lever 53 with the cam 44b.

As the first curtain winding shaft 30 is rotated in accordance with the movement of the first curtain and the first curtain control member 34 is rotated in the clockwise direction, the pawl 35a of the regulating lever 35 contacting lightly and slidably with the groove 34a is moved downward. When the first curtain reaches to a predetermined position (the end position of the whole operation of the curtain), the pawl 35a of the regulating lever abuts against the terminal end 34c of the groove 34a, as best shown in FIG. 8.

FIG. 8 shows the pawl 35a of the regulating lever impinged on the end of the spiral groove 34a (the lever 35 shown with a full line). The impingement gives a leftward force to the shaft 36 which in turn gives the bearing 66a of the damper lever a force to rotate the damper lever 66 in the counterclockwise direction, thereby producing in the pawl 66b at the tip of the damper lever an impact force in direction as indicated by an arrow A, and then the impact force is imparted onto the piston 68b of the air damper. Then, the piston 68b moves toward the direction as indicated by the arrow A, while forcing out air through the narrow gap between the piston 68b and the inner wall of the cylinder 68 and continuously absorbing the kinetic energy given to the first curtain mechanism by converting the energy into the work. Due to the absorption of excessive energy, the bound of the first curtain mechanism is prevented. When the piston 68b has absorbed the kinetic energy possessed by the first curtain mechanism during the course of its travel toward the direction as indicated by the arrow A, the piston 68b is pushed back by the action of the return spring 68a of the damper toward the direction a indicated by an arrow B, and the damper lever is stopped by a stopper pin 85, thereafter abutting against the pin. According to the move of the damper lever 66, the regulating lever shaft 36 moves to the right and the regulating lever 35 pushes rotatively the control member 34 in the counterclockwise direction to stop the first curtain mechanism finally at its correct position. Thus with the above-mentioned arrangement, it is possible to stop the first curtain at its correct position by perfectly absorbing the kinetic energy of the first curtain mechanism, which is not possible by the unreliable methods such as using the friction.

If the electric current fed from the electric circuit (not shown) to the coil 54a of the electromagnet is cut off before or after the completion of the first curtain operation, the electromagnetic 54 loses its attractive force. As a result, the electromagnetic holding lever 53 is pushed out of the cam 44b by the action of force imparted by the cam 44b, the second curtain control member 44 can no more be maintained in the position as shown in FIGS. 1 and 6, and then the second curtain 20 starts its operation. Simultaneously as the second curtain continues its operation, the pawl 45a of the second curtain regulating lever moves downward gradually in accordance with the rotation of the second curtain control member 44 and finally engages with the end of the spiral groove 44a at the end of the operation, to stop the rotation of the second curtain winding shaft 40, the stopping mechanism is same as that described previously in regard to the operation of the first curtain. As clearly shown in FIGS. 3 and 4, in association with the second curtain operation, the signal gear 25 is rotated in the clockwise direction and the signal transmission gear 26 engaged therewith is rotated in the counterclockwise direction, respectively, causing the front end 27b of the transmission lever 27 to be drawn out of the notch 7a of the notch plate 7 by pushing the opposite end 27a of the transmission lever in the direction opposite to that as shown in FIG. 3 at the end of the operation. This is shown in FIGS. 2 and 4.

Hereafter, the winding operation is explained in detail.

Since as described above the front end 27b of the transmission lever is disengaged with the notch 7a of the notch plate at the end of the second curtain operation, the deficient-teeth gear 6 can now be rotated. Accordingly, if a counterclockwise rotative force is applied to the winding lever 1 (FIGS. 1 and 2), the force thus applied is transmitted to the deficient-teeth gear 6 through the gears 2, 3, 4 and 5. Owing to the clockwise rotation of the deficient-teeth gear 6 (in the direction as indicated by an arrow in FIG. 4), the first curtain winding gear 33 is at first engated with the deficient-teeth gear 6 rotated by the latter and the first curtain winding drum 31 winds up the first curtain 10. During this operation, the second curtain 20 is in the end state of its operation. Subsequently, the deficient-teeth gear 6 and the second curtain winding gear 43 are engaged and the winding of the second curtain is started. At the initial stage of the winding, the first curtain 10 and the second curtain 20 keep sufficient lapped portion to each other.

When the winding of the second curtain is started, the second curtain winding drum 22 is rotated and the signal transmission gear 26 begins to rotate in the clockwise direction from the position as shown in FIG. 1 and FIG. 4. Then, the transmission lever 27 is permitted to move in the counterclockwise direction and the pawl 27b of the transmission lever lightly contacts the periphery of the notch plate 7.

The deficient-teeth gear 6 further continues its rotation and brings the first curtain to slightly wound up state of the position in FIG. 1, the first curtain winding gear 33 abuts with the toothless portion of the deficient-teeth gear 6 and returns toward the winding side (in the direction of the curtain operation) due to the rotative tendency of the first curtain winding drum 12 in the clockwise direction, and the tip of the first curtain holding lever 50 abuts against the cam 34b of the first curtain control member to be engaged therewith. At this time, the second curtain 20 is still in its winding process and the winding is continued by the deficient-teeth gear 6. When the second curtain 20 is brought to a position slightly wound up from the position in FIG. 2, the second curtain winding gear 43 abuts with the toothless portion 6a of the deficient-teeth gear 6. consequently, the movement of the second curtain winding gear 43 toward the winding direction (in the direction of the curtain operation) is permitted, and when the gear 43 has returned back slightly toward the reverse direction, the cam 44b of the second curtain control member is engaged with the tip of the second curtain holding lever and stopped in the state as shown in FIG. 1. This is shown in FIG. 6.

The deficient-teeth gear 6 continues its rotation slightly further and completes its predetermined rotative motion to reach a prescribed position (shown in FIG. 1), the pawl 27b of the transmission lever 27 being contacted, the external periphery of the notch plate is now engaged into the notch 7a of the notch plate 7 due to the action of the biasing force applied by the spring 28 to prevent further rotation or return back of the deficient-teeth gear 6, thus maintaining a state in which the toothless portion 6a of the deficient-teeth gear faces to the two winding gears 33 and 43. The pawls 35a and 45a of the regulating levers 35 and 45 are moved upward gradually during the course of the winding operation to reach the position as shown in FIG. 1 at the end of the operation. As mentioned hereinbefore, the whole mechanism returns to its initial position and then the shutter operation and the winding operation can be repeated again for photographing.

In the above-mentioned embodiment of the system according to the present invention, the transmission lever 27 which is driven by the signal gear 25 provided integrally with the second curtain winding drum 22 has been described as being an engagement holding member for the deficient-teeth gear 6. However, the function of the member can be substituted by the movement of any operational member which changes its state from the shutter winding stage to the end of the shutter operation within the spirit of the present invention. For example, this may be constructed by those members which are associated with an accelerating lever for the mirror operation of the quick-return mechanism as used in single lens reflex cameras.

The effects of the system described above are as follows:

In the first place, according to the system of the present invention, it provides a preferable shutter characteristics in that, since the first and the second curtain winding mechanisms are perfectly disconnected at the end of the respective winding operations from the driving-coupling gearing system for the winding operations, the inertia of the curtain operating mechanism can be lessened and the operating speed thereof can be increased with limiting the variations of the speed to its lower extremity.

In the next place, according to the present invention, the system construction can be remarkably simplified by arranging the winding driving mechanism in such a manner that the final stage of the winding shaft coupling system in the driving-coupling gearing system is composed of one piece of gear having a predetermined toothless portion. Further, according to the system of the present invention, there is no possibility of light leakage in the course of the differential winding of curtains, producing a highly effective results from a practical viewpoint, because the first and second curtain winding shafts facing to the toothless portion of the driving-coupling gearing system when the shutter is wound up are arranged so that the first curtain winding shaft is placed at a position close to the rear end of the toothless portion as viewed in the direction in which the toothless portion is moved during the course of the winding operation and the second curtain winding shaft is placed at the other position close to the front end thereof, thereby permitting the first curtain to be wound in advance of the second curtain and the latter to be wound subsequently thereto. In general, if the first and the second curtain are to be wound by means of one piece of deficient-teeth gear, the first and the second curtain winding shafts are rotated by an equal amount of angle. However, by changing the diameters of the winding drum (those portions used to wind the strings or curtains) to each other, it is possible to change the amount of the curtains wound in relation to the rotation of the said winding shafts and to facilitate the adjustment of the relative positions of the curtains at the end of the winding operation. Accordingly, the necessity of complex mechanism for the adjustment of the winding amount can be eliminated. By selecting the diameter of the first curtain winding drum 31 to a value slightly larger than that of the second curtain winding drum, the first and the second curtains are lapped each other during the winding operation, but the lapping of the rear end 10c of the first curtain and the front end 20c of the second curtain may be eliminated at the end of the winding operation. Thus, high shutter speeds such as 1/1000 second, 1/2000 second, etc, can be attained easily.

The present invention has been described in detail with reference to a preferred embodiment according to the invention and it will be clearly understood that the various modifications and variations may be possible to the skill of the art within the spirit and the scope of the present invention.

For example, the damper is not limited to the damper of piston type having a gap between the cylinder and the piston as shown in the above-mentioned embodiment, but a damper having an air slot piston type may be used. instead. Further, it is not necessarily required to adopt a damper of any air damper type.

Further, although the present invention has been described as being applied to a camera the shutter speed of which is controlled electrically, it will be easier for those skilled in the art to apply the present invention to cameras in which the shutter speed is controlled by any other means.

What is claimed is:

1. A focal plane shutter system for photographic camera comprising:
   a. a first shutter curtain mechanism for driving a shutter curtain which is moved from a closed position to an opened position to cause the film to be exposed to light when the shutter is operated;
   b. a second shutter curtain mechanism having a curtain winding shaft provided independently of the first shutter mechanism and driving a shutter curtain which is moved from an opened position to a closed position to stop the film exposure when the shutter is operated;
   c. a winding mechanism having a winding force transmission member provided with a portion to be engaged with the first and second shutter curtain mechanisms during the course of the winding operation thereof and with another portion to be disengaged with the first and second shutter curtain mechanism at the end of the winding operation, said winding force transmission member being composed of one piece of deficient-teeth gear and arranged so that, during the course of one rotation of the gear, a toothed portion of the gear brings the first and second curtain mechanisms into a state in which the two mechanisms are wound up completely and a toothless portion of the deficient-teeth gear corresponds to the first and second curtain mechanisms after the completion of the winding operation, a further member being provided which engages with and holds the winding force transmission member at a position where the toothless portion faces to the two winding shafts when the toothless portion has reached a position facing the two winding shafts through the operation of the winding mechanisms, and wherein the engagement holding member is caused to escape into a holding release zone by overcoming a biasing force for the engagement holding action through the action of ending the shutter operation;
   d. a holding means for holding the first and second shutter curtain mechanisms at end positions of the winding operation;
   e. a release means for controlling the holding means to operate the first and second shutter curtain mechanisms for the film exposure; and
   f. a stopper means for stopping the first and second shutter curtain mechanisms at the end positions of operation.

2. A focal plane shutter system as set forth in claim 1, wherein the stopper means comprises a damper device arranged so as to damp an external force applied thereto and return to a predetermined position when the damping process is completed and a member which converts the rotative force of the winding shaft into a linear force to be transmitted to the damper device when the curtains have reached the end positions of operation, thereby causing the shutter curtains to stop at fixed positions at the end of the operations thereof without any bounce.

3. A focal plane shutter system as set forth in claim 1, wherein the first and second curtain mechanisms have respective curtain winding shafts and respective gears mounted to the curtain winding shafts, the gears being engaged with the deficient-teeth gear during the rotation of the deficient-teeth gear.

4. A focal plane shutter system for photographic camera comprising:

a. a first shutter curtain mechanism for driving a shutter curtain which is moved from a closed position to an opened position to cause the film to be exposed to light when the shutter is operated;

b. a second shutter curtain mechanism having a curtain winding shaft provided independently of the first shutter curtain mechanism and driving a shutter curtain which is moved from an opened position to a closed position to stop the film exposure when the shutter is operated;

c. a winding mechanism having a winding force transmission member provided with a portion to be engaged with the first and second shutter curtain mechanism during the course of the winding operation thereof and with another portion to be disengaged with the first and second shutter curtain mechanisms at the end of the winding operation, d. a holding means for holding the first and second shutter curtain mechanisms at end positions of the winding operation;

e. a release means for controlling the holding means to operate the first and second shutter curtain mechanisms for the film exposure; and f. a stopper means for stopping the first and second shutter curtain mechanisms at the end positions of operation, wherein ther stopper means comprises spiral grooves provided respectively on two winding shafts of the first and second curtain mechanisms and members which move upward or downward slidably contacting the spiral grooves when the winding shafts are rotated and which determines the end positions of the operation by abutting against ends of the spiral grooves when the first and second curtains are brought to the respective end positions of operation.

5. A focal plane shutter as set forth in the claim 3, wherein the stopper means is further comprising a damper device arranged so as to damp an external force applied thereto and return to a predetermined position when the damping process is completed and a member which converts the rotative force of the winding shaft into a linear force to be transmitted to the damper device when the curtains have reached the end positions of operation, thereby causing the shutter curtains to stop at fixed positions at the end of operations thereof without any bounce.

* * * * *